(12) United States Patent
Breuer et al.

(10) Patent No.: US 8,787,252 B2
(45) Date of Patent: Jul. 22, 2014

(54) PRIVATE BASE STATION AND RADIO NETWORK ENTITY

(75) Inventors: Volker Breuer, Bötzow (DE); Joerg Gustrau, Ulm (DE); Meik Kottkamp, München (DE); Demian Martos-Riano, Berllin (DE); Thomas Ulrich, Bad Dürkheim (DE); Alexander Vesely, Feldbach (AT)

(73) Assignee: Nokia Siemens Networks Oy, Espoo (FI)

(*) Notice: Subject to any disclaimer, the term of this patent is extended or adjusted under 35 U.S.C. 154(b) by 1209 days.

(21) Appl. No.: 12/666,325

(22) PCT Filed: Jun. 23, 2008

(86) PCT No.: PCT/EP2008/057927
§ 371 (c)(1),
(2), (4) Date: Dec. 23, 2009

(87) PCT Pub. No.: WO2009/000790
PCT Pub. Date: Dec. 31, 2008

(65) Prior Publication Data
US 2010/0182954 A1   Jul. 22, 2010

(30) Foreign Application Priority Data
Jun. 26, 2007 (FI) .................................... 20075485

(51) Int. Cl.
*H04W 4/00* (2009.01)
(52) U.S. Cl.
USPC ............................ 370/328; 370/310; 370/329

(58) Field of Classification Search
None
See application file for complete search history.

(56) References Cited

U.S. PATENT DOCUMENTS

| | | | |
|---|---|---|---|
| 5,995,839 A * | 11/1999 | Coursey et al. | 455/445 |
| 2004/0052223 A1 * | 3/2004 | Karaoguz et al. | 370/328 |
| 2005/0239453 A1 * | 10/2005 | Vikberg et al. | 455/426.1 |
| 2006/0019688 A1 * | 1/2006 | Kil | 455/517 |
| 2008/0102787 A1 * | 5/2008 | Landschaft et al. | 455/404.2 |
| 2008/0207170 A1 * | 8/2008 | Khetawat et al. | 455/411 |
| 2008/0220763 A1 * | 9/2008 | Chapin | 455/422.1 |

FOREIGN PATENT DOCUMENTS

| | | |
|---|---|---|
| RU | 2173031 C2 | 8/2001 |
| RU | 2193287 C2 | 11/2002 |
| RU | 2198479 C2 | 2/2003 |
| WO | WO 01/03459 A1 | 1/2001 |
| WO | WO 01/93617 A1 | 12/2001 |
| WO | WO-2008/036961 A2 | 3/2008 |

* cited by examiner

*Primary Examiner* — Hassan Phillips
*Assistant Examiner* — Gautam Sharma
(74) *Attorney, Agent, or Firm* — Harrington & Smith

(57) ABSTRACT

There is provided a private base station including a processing unit configured to scan data of overlaying macro cells of a public radio network in order to report the location of the private base station; a communication unit configured to request a connectivity service from the public radio network by using identification data of the private base station and the location of the private base station; and a communication unit configured to receive grant to utilize the re-quested connectivity service once the identification data has been verified by the public radio network.

31 Claims, 4 Drawing Sheets

PRIVATE BASE STATION AND RADIO NETWORK ENTITY

FIELD

The invention relates to a private base station, to a radio network entity, to a radio system, to a method, and to a computer program distribution medium.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Existing radio systems (GSM, Global System for Mobile Communications; WCDMA/HSDPA, Wide-band Code Division Multiple Access/High Speed Downlink Packet Access) are not optimally suited for, for example, downloading movies from the Internet since they were developed and defined under the assumption of a coordinated network deployment.

To alleviate the problem, a user can acquire a private base station for his/her own disposal. The private base stations are typically associated with uncoordinated and large-scale deployment. A private base station may be called with many names such as Home Base Station, Home NodeB, femto eNodeBs or simply Home Access and it has become a popular topic within the operator and manufacturer community.

It can be assumed that the end-user buys an economic private base station and installs the physical entity at his home. The private base station then provides coverage and service to the user equipment registered by the owner of the private base station. Still, the private base station may use the same spectrum as the radio system. The private base station may be connected via a DSL (Digital Subscriber Line) and via the core network of the operator towards the Internet. Some local breakout scenarios bypassing the core network of the operator may also exist. In any case the consumed services of the owner of a private base station do not eat up capacity of macro cells of the radio system.

Operators aim is to control the usage of 3G and private base stations, e.g. LTE HNBs (LTE, long term evolution, Home NodeBs) in various aspects, such as:

LTE HNB may only be utilized by subscribers owning it or by subscribers to which the owner granted access, LTE HNBs may only be able to connect to the network if it is able to identify itself towards the network and prove that an operator sold it or a retailer authorized by an operator, which would provide the operator a certain level of confidentiality that the equipment, which operates in his licensed spectrum, is working properly. One may even think that globally acting operators may allow LTE HNBs to connect to networks owned by one of the subsidiary operators (e.g. during holiday season at the seaside apartment), An operator may allow to accept "foreign guest subscribers" to access the owner's LTE HNB, but does not provide mobility support into it's own network if no national roaming agreement is available with the foreign operator the guest is subscribed to.

A further requirement for 3G and LTE Home Node Bs ("HNB" in short for both) is that the administrative work imposed by a mass deployment of HNBs is reduced to the absolute minimum and hence provides possibilities to reduce OPEX costs. Another requirement is the support of mobility for mobiles being active towards (and probably from) the macro layer, which creates further administrative burden for establishing neighbour-ship relations.

Currently a proposal is discussed in 3GPP TSG RAN WG3 where a (macro) eNB connects automatically towards the core network, being well preconfigured by the RAN O&M (operation and maintenance) with area identities (Tracking Area) and a basic IP address. However, RAN O&M does not exist for HNBs and would not help as the customer is able to freely choose the site of the HNB.

BRIEF DESCRIPTION

According to an aspect of the present invention, there is provided a private base station as specified in claim 1.

According to another aspect of the present invention, there is provided a radio network entity as specified in claim 5.

According to another aspect of the present invention, there is provided a radio system as specified in claim 10.

According to another aspect of the present invention, there is provided a method as specified in claim 15.

According to another aspect of the present invention, there is provided a method as specified in claim 20.

According to another aspect of the present invention, there is provided a private base station as specified in claim 24.

According to another aspect of the present invention, there is provided a radio network entity as specified in claim 25.

According to another aspect of the present invention, there is provided a computer program distribution medium as specified in claim 26.

According to another aspect of the present invention, there is provided a computer program distribution medium as specified in claim 28.

The method and arrangement of the invention provide several advantages. Auto configuration of private base stations into public core network is provided.

BRIEF DESCRIPTION OF THE DRAWINGS

Embodiments of the present invention are described below, by way of example only, with reference to the accompanying drawings, in which.

DETAILED DESCRIPTION OF THE INVENTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
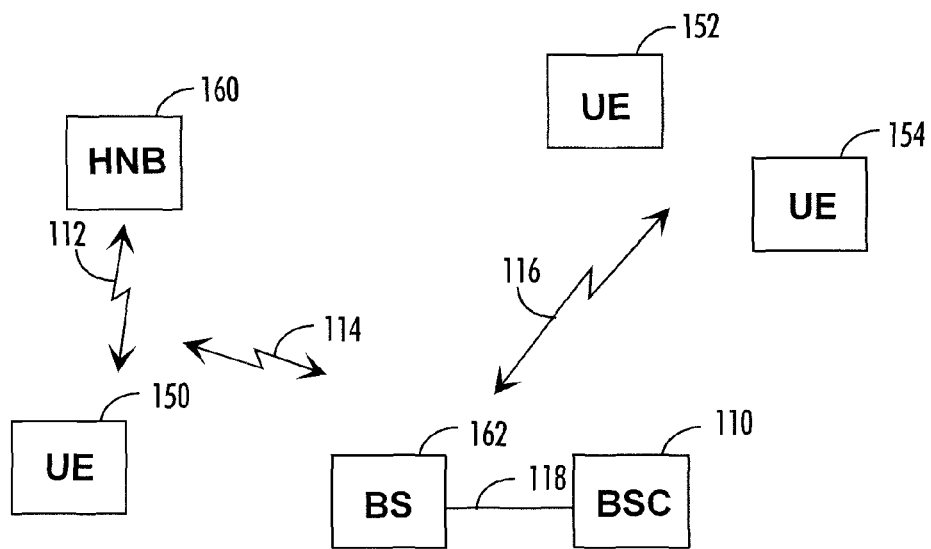
FIG. 1 illustrates an example of a radio system.

With reference to FIG. 1, examine an example of a radio system to which embodiments of the invention can be applied. The radio system may be based on GERAN (GSM/EDGE RAN, where EDGE stands for Enhanced Data rates for Global Evolution and RAN stands for Radio Access Network), UTRAN (UMTS Terrestrial RAN) or LTE network elements, without limiting to them. The radio system may also utilize HSDPA, HSUPA (High Speed Uplink Packet Access), WiFi (known as wireless fidelity) and WIMAX (Worldwide Interoperability for Microwave Access).

While GSM and UTRAN are well known technologies as such, LTE is a new technology and is based on OFDM (Orthogonal Frequency Division Multiplex) modulation format, MIMO (Multiple Input Multiple Output) antenna technology and SAE features which are known per se.

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

The exemplary radio system of FIG. 1 may comprise user equipment 150 to 154, at least one base station 160 to 162, and a base station controller 110, which can also be called as a radio network controller. The user equipment 150 to 154 which may also be called user terminals may communicate with the base stations 160 to 162 using signals 112 to 116. The public base station 162 may have connection to the base station controller 110 by a digital transmission link 118. The private base station 160 may not necessarily be a part of the radio system although it may have a connection to the core network such as the base station controller 110. The private base station 160 may be connected, for example, to WLAN (Wireless Local Area Network) and utilize the Internet. The signals 112 to 116 between the user terminals 150 to 154 and the base stations 160 to 162 carry digitized information, which is e.g. traffic data or control data.

Each base station 160 to 162, both private and public, broadcast a signal 112 to 116, which may be a pilot signal such that a user terminal 150 to 154 can observe a potential base station to serve the user terminal 150 to 154. Based on the pilot signals, the user terminal selects a base station with which to start a communication when switched on or to which to perform a handoff during a normal operation. All the public base stations 162 are typically meant to serve and communicate with the user terminals 150 to 154 but not all private base stations 160 are meant to serve or communicate with all the user terminals 150 to 154. A few scrambling codes of pilot signals are reserved for a possibly large number of private base stations. Hence, a certain scrambling code does not properly identify a private base station.

Each public base station 162 broadcast a signal 112 to 116 with information depending on the location of the base station. Hence, when the user terminal 150 to 154 is travelling from one location to another in the radio system, the user terminal 150 receiving the broadcast signals all the time will observe the change in the information depending on its location. That is, the information depending on the location of the public base station 162 can be used to determine the location of the user terminal 150 since the user terminal 150 has to be near enough a public base station to receive the broadcast.

Figure 2:
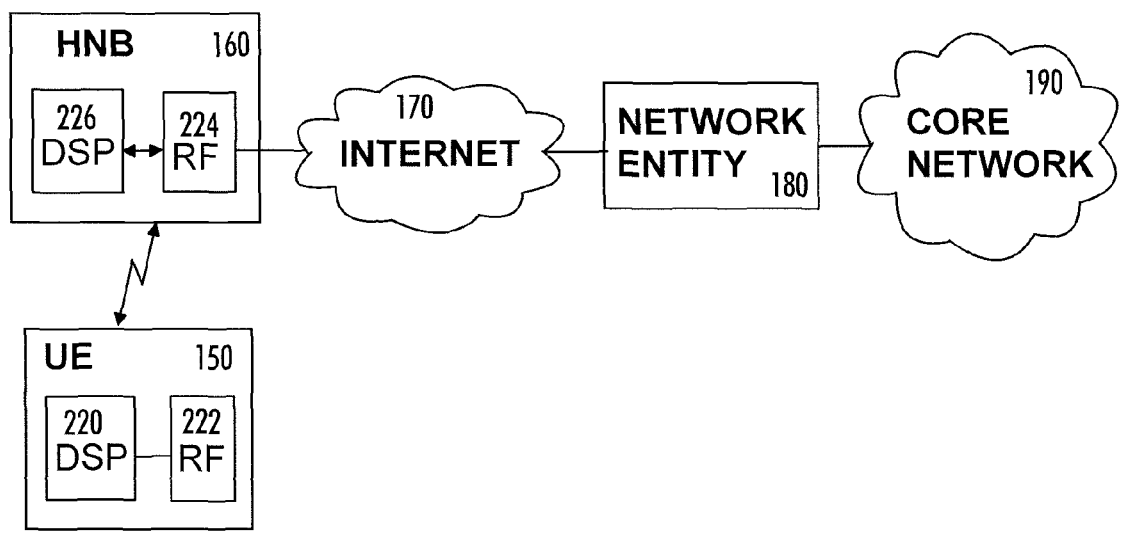
FIG. 2 illustrates another example of a radio system.

FIG. 2 illustrates an example of a user terminal 150, a private base station 160, and radio network. The user terminal 150 comprises a communication unit 222 configured to communicate with one or more base stations 160, and a processing unit 220 for controlling the functions of the mobile terminal. The processing unit 220 is typically implemented with a microprocessor, a signal processor or separate components and associated software.

The private base station 160 comprises: a communication unit 224 configured to communicate with at least one mobile terminal 150, and with a fixed IP network, such as the Internet 170, e.g. via a DSL connection. The private base station 160 further comprises: a processing unit configured to scan data of overlaying macro cells of a public radio network in order to report the location of the private base station; a communication unit configured to request a connectivity service from the public radio network by using identification data of the private base station; and the determined location of the private base station; and a communication unit configured to receive grant to utilize the requested connectivity service once the identification data has been verified by the public radio network. The processing unit 226 is typically implemented with a microprocessor, a signal processor or separate components and associated software. The base station 160 may also include a memory and other elements.

Traffic between the user terminal 150 and the public core network 190 may be carried via an external network, not owned by a mobile network operator, such as via a fixed IP network 170, e.g. the Internet, provided by a fixed network operator. The network connection from the user terminal 150 to the core network 190 may be authorized via a network entity 180 provided by a mobile network operator, for example.

The network entity 180 comprises: a processing unit configured to provide data of overlaying macro cells of the public radio network to a private base station in order to enable the private base station to report the location of the private base station; a communication unit configured to receive a connectivity service request including identification data and the location of the private base station from the private base station; a processing unit configured to verify the identification data received from the private base station by communicating with an identification register for private base stations; and a processing unit configured to grant the requested connectivity service to the private base station once the identification data has been verified.

In an embodiment, the private base station is enabled to read area codes (e.g. Tracking Area for LTE access, Location/Routing area for UTRAN access) and cell identifications of the overlaying macro cells (e.g. UTRAN or GERAN) in order to report this data to the appropriate node and to report the distance to those macro sites by all available means.

In an embodiment, the private base station is able to identify itself towards the public network with corresponding means as a user terminal identifies itself towards the network with data stored on the SIM (subscriber identity module)/USIM (UMTS subscriber identity module). The respective data may be securely stored within the private base station and/or is provided via a HNBSIM (in which case this rather represents a (HNB operation) subscription than an equipment related data).

In an embodiment, the private base station may be able to contact to a default IP address in order to learn more about regional connectivity possibilities.

In an embodiment, location registers can be provided for private base stations. Such location registers may correspond the location registers as known from user terminals, i.e. VLR (visitor location register) and HLR (home location register).

In an embodiment, the private base station may be operated remotely via a PC (personal computer) or even via a special application on a mobile terminal.

In an embodiment, the operator may require that the user terminal of the owner and the user terminal of any guests to be within the private base station coverage area in order to verify the user terminal and private base station subscription and equipment data.

In an embodiment, the private base station may be able to store connectivity and access rights once it was connected to the public network on a specific site ("site" meaning that the private base station has reported certain overlaying macro cells and this data did not change substantially). The public network, on the other hand, may be able to request re-authentication of the private base station (together with at least the owner) if required.

The steps/points, signaling messages and related functions described in the following FIGS. 3 to 5 may be in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The server operations illustrate a procedure that may be implemented in one or more physical or logical entities. The signaling messages are only exemplary and may even comprise several separate messages for transmitting the same information. In addition, the messages may also contain other information.

Figure 3:
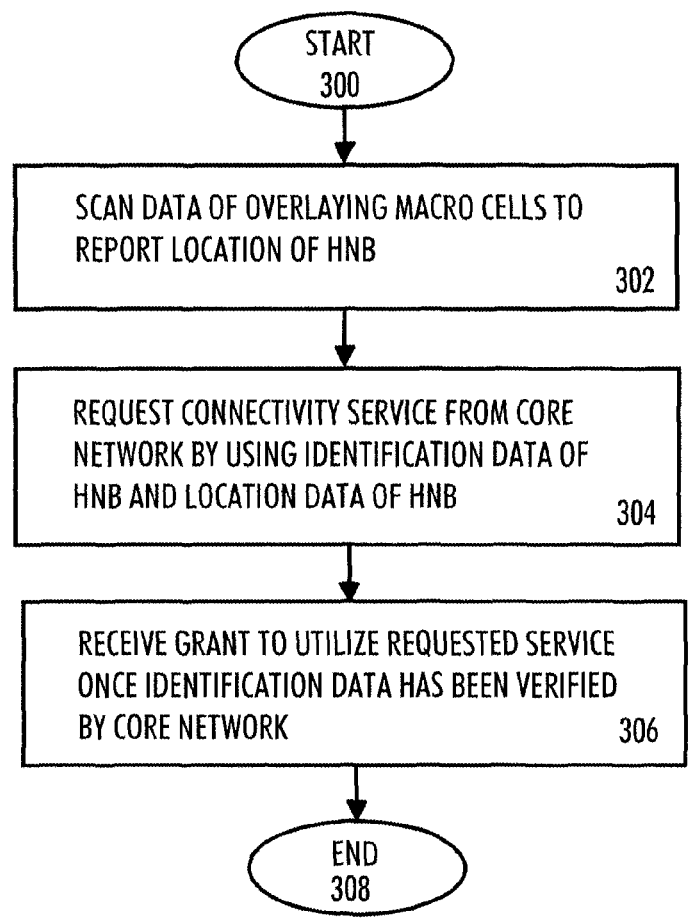
FIG. 3 illustrates a method according to an embodiment.

FIG. 3 shows an example of a method according to an embodiment of the invention. The method starts in 300. In 302, data of overlaying macro cells of a public radio network is scanned by a private base station in order to report the location of the private base station.

In 304, a connectivity service is requested from the public radio network by using identification data of the private base station and the location of the private base station. In 306, a grant to utilize the requested connectivity service is received once the identification data has been verified by the public radio network. The method ends in 308.

Figure 4:
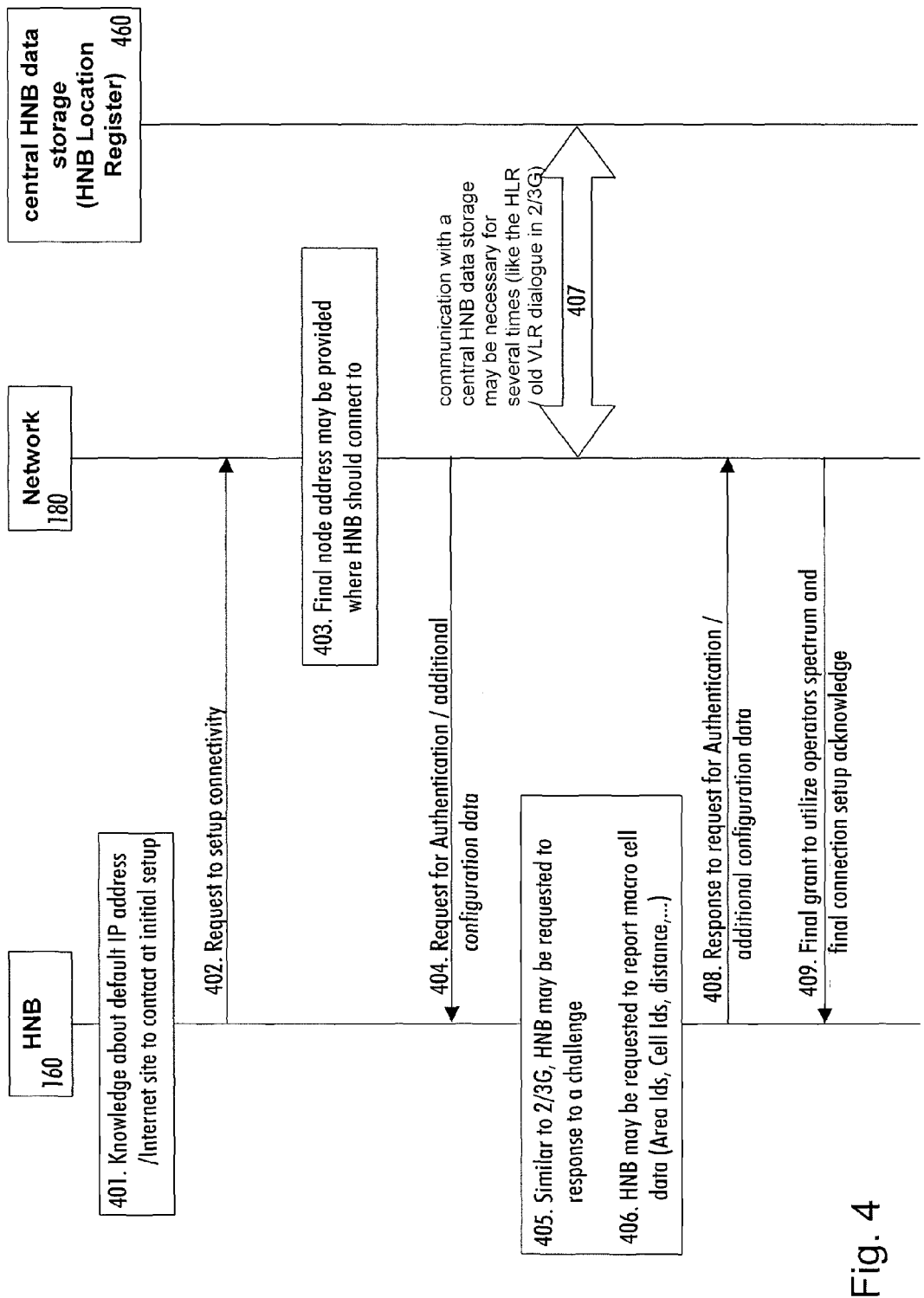
FIG. 4 shows a signal sequence diagram illustrating an embodiment.

FIG. 4 shows a signal sequence diagram illustrating general automatism in the communication between a private base station 160 and a radio network 180. The private base station 160 has knowledge about a default IP address/Internet site in order to contact the network 180 at initial setup. In 401 and 402, the private base station 160 tries to contact the network under a known IP address or website (user may be operating via remote control) providing basic private base station identification, which may be unknown even to the owner and stored in the private base station in a secure way and may be transmitted to the network via a secured line, e.g. via IPsec (IP security protocol).

In 403, the first network node contacted by the private base station 160 may provide the final node address the private base station is to connect to or redirects directly. In 404, the network 180 request the private base station 160 to authenticate itself and/or provide additional data, e.g. of the overlaying macro cells.

In 405, corresponding to 2/3G, the private base station may be requested to response to a challenge (which may include the user terminal as well). The authentication process may require the user terminal to generate a response to the challenge sent by the network. The network may also request the owner's user terminal to identify itself.

In 406, the private base station may be requested to report macro cell data, i.e. Area Ids, Cell Ids, distance. If the network requests the private base station to provide macro cell layer data, the private base station may be required to read BCHs (broadcast channels) and perform PHY (physical layer) measurements.

In 407, the network 180 may be required to communicate with a central data storage for private base stations 460 for several times (as the HLR and VLR dialogue in 2/3G). The communication with the central data storage 460 may be required dependent on the network setup of the operator.

In 408, the private base station responds to the request for authentication/additional configuration data by providing all the data requested by the network.

In 409, the network finally grants service and the final grant to utilize operators spectrum and final connection setup acknowledge is received from the network.

Figure 5:
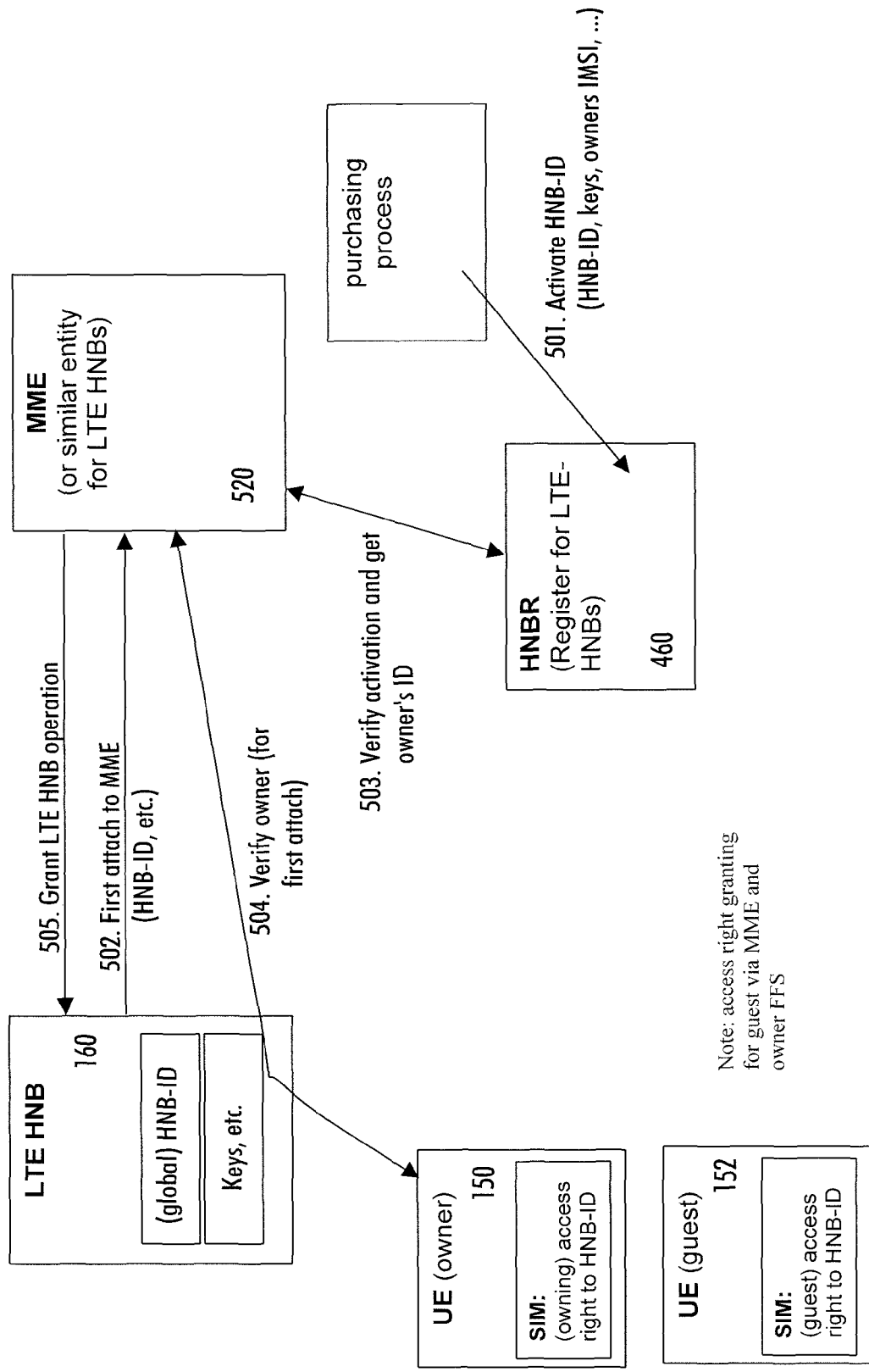
FIG. 5 illustrates an example of a network structure for authenticating a private base station.

FIG. 5 shows an example of HLR/VLR like network structure for authenticating a private base station. The identification of LTE private base stations requires the deployment of a similar concept than VLR/HLR for user terminals. At customisation, the LTE private base station gets a unique identification, keys, certification or alike in order to be able to identify itself towards the core network. Those identifications are "activated" once the LTE private base station is sold to a subscriber.

A two-phase authentication (once of the LTE HNB, once of the UE) may be envisaged for initial deployment at a certain site. Whether later on the subscriber needs to be within the home coverage, i.e. communicating with the network, the LTE private base station registration can be discussed. However this requirement may be rather omitted as it seems unlikely that the owner needs to be available in case of power outage problems and his/her friend is not able to utilize the guest access rights until he/she returns home.

An LTE private base station 160 may be embedded in the overall system in the following way. In 501, during purchasing process, the HNB-ID will be entered in a register for LTE HNBs 460 and the entry will be activated. In 502, at the first attach to the network (MME, mobility management entity, is assumed to be the corresponding C-plane node to communicate with), the LTE private base station 160 requests the grant for operation.

In 503, the network 520 verifies the identification(s) provided by the private base station and gets owner's ID. In 504, the network 520 may check whether the user terminal 150, 152 is within the LTE private base station coverage area (but only if this is possible for the first attach to be verified).

In 505, the network 520 grants operation to the private base station 160 if all verifications are successful.

Next, an example of generation of neighbour ship relations between macro and home layer is described. Being in the possession of knowing with quite high likelihood to which macro cell a user terminal roaming out of the home cell is able to handover to, would enable the private base station to address the target to which a handover may be performed.

On the other hand, data provided from the private base station to the network may be distributed to the macro nodes in order to address the home-node properly. A necessary condition for that is that the user terminal is able to select the home cells it is allowed to connect autonomously also when being in active mode and to provide respective information to the source (macro layer) node.

The embodiments of the invention may be realized in an electronic device comprising a controller. The controller may be configured to perform at least some of the steps described in connection with the flowchart of FIG. 3 and in connection with FIGS. 4 to 5. The embodiments may be implemented as a computer program comprising instructions for executing a computer process. The computer process comprises: providing data of overlaying macro cells of a public radio network to a private base station in order to enable the private base station to report the location of the private base station; receiving a connectivity service request including identification data and the location of the private base station from the private base station; verifying the identification data received from the private base station by communicating with an identification register for private base stations; and granting the requested connectivity service to the private base station once the identification data has been verified.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

The present invention is applicable to any user terminal, server, corresponding component, and/or to any communication system or any combination of different communication systems with private base stations. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

The invention claimed is:

1. A private base station comprising one or more processors and one or more memories including computer program code, the one or more memories and the computer program code configured, with the one or more processors, to cause the private base station to perform at least the following:
scanning data comprising at least one of: (i) area codes, or (ii) cell identifications, of overlaying macro cells of a public radio network in order to enable the private base station to report location information specific to the private base station, wherein the location information comprises at least one of: (i) the area codes, or (ii) the cell identifications of the overlaying macro cells;
requesting a connectivity service from the public radio network by using identification data of the private base station and the location information specific to the private base station; and
receiving grant to utilize the requested connectivity service once the identification data has been verified by the public radio network.

2. The private base station of claim 1, wherein the scanning further comprises scanning area codes and cell identifications of the overlaying macro cells in order to report the scanned area codes and cell identifications to an appropriate radio network node and to report the distance to the overlaying macro cells.

3. The private base station of claim 1, wherein the computer program code is further configured, with the one or more processors, to cause the private base station to contact to a default IP address in order to scan information on regional connectivity possibilities.

4. The private base station of claim 1, wherein the computer program code is further configured, with the one or more processors, to cause the private base to store connectivity and access rights to the public radio network on a specific site once the grant to utilize the connectivity service has been received.

5. A radio network entity comprising one or more processors and one or more memories including computer program code, the one or more memories and the computer program code configured, with the one or more processors, to cause the radio network entity to perform at least the following:
provide data of at least one macro cell of the radio network entity to a private base station, wherein the data comprises at least one of: (i) an area code, or (ii) a cell identification of the at least one macro cell;
receive a connectivity service request including identification data and a location information specific to a private base station from the private base station; and
verify the identification data received from the private base station by communicating with an identification register for private base stations; and
grant the requested connectivity service to the private base station once the identification data has been verified.

6. The radio network entity of claim 5, wherein the computer program code is further configured, with the one or more processors, to cause the radio network entity to provide a final node address where the private base station is to be connected.

7. The radio network entity of claim 5, wherein the computer program code is further configured, with the one or more processors, to cause the radio network entity to request at least one of: authentication data and additional configuration data from the private base station.

8. The radio network entity of claim 5, wherein the computer program code is further configured, with the one or more processors, to cause the radio network entity to communicate, with a central data storage of private base stations in order to verify the location specific to the private base station.

9. The radio network entity of claim 5, wherein the computer program code is further configured, with the one or more processors, to cause the radio network entity to check whether a user terminal that is requesting a network connection via the private base station is within the private base station coverage area.

10. A radio system comprising:
a private base station configured:
to scan data comprising at least one of: (i) area codes, or (ii) cell identifications, of overlaying macro cells of a public radio network in order to enable the private base station to report a location information specific to the private base station, wherein the location information comprises at least one of: (i) the area codes, or (ii) the cell identifications of the overlaying macro cells;
to request a connectivity service, from the public radio network by using identification data of the private base station and the location information specific to the private base station, and
to receive grant to utilize the requested connectivity service once the identification data has been verified by the public radio network; and
a radio network entity configured:
to provide data of at least one macro cell of the radio network entity to a private base station, wherein the data comprises at least one of: (i) an area code, or (ii) a cell identification of the at least one macro cell; and to receive a connectivity service request including identification data and the location information specific to the private base station from the private base station; and to verify the identification data received from the private base station by communicating with an identification register for private base stations; and to grant the requested connectivity service to the private base station once the identification data has been verified.

11. The radio system of claim 10, wherein the private base station is further configured to scan area codes and cell identifications of the overlaying macro cells in order to report the scanned area codes and cell identifications to an appropriate radio network node and to report the distance to the overlaying macro cells.

12. The radio system of claim 10, wherein the private base station is further configured to store connectivity and access rights to the public radio network on a specific site once the grant to utilize the connectivity service has been received.

13. The radio system of claim 10, wherein the radio network entity is further configured to request at least one of: authentication data and additional configuration data from the private base station.

14. The radio system of claim 10, wherein the radio network entity is further configured to check whether a user terminal that is requesting a network connection via the private base station is within the private base station coverage area.

15. A method comprising:
providing, by a public radio network, data of at least one macro cell of the radio network entity to a private base station, wherein the data comprises at least one of: (i) an area code, or (ii) a cell identification of the at least one macro cell;

receiving, by a public radio network, a connectivity service request including identification data and a location information specific to the private base station from the private base station; and verifying, by the public radio network, the identification data received from the private base station by communicating with an identification register for private base stations; and granting, by the public radio network, the requested connectivity service to the private base station once the identification data has been verified.

16. The method of claim 15, further comprising: providing a final node address where the private base station is to be connected.

17. The method of claim 15, further comprising: requesting at least one of: authentication data and additional configuration data from the private base station.

18. The method of claim 15, further comprising: communicating with a central data storage of private base stations in order to verify the location specific to the private base station.

19. The method of claim 15, further comprising: checking whether a user terminal that is requesting a network connection via the private base station is within the private base station coverage area.

20. A method comprising:
scanning data comprising at least one of: (i) area codes, or (ii) cell identifications, of overlaying macro cells of a public radio network by a. private base station in order to enable the private base station to report location information specific to the private base station, wherein the location information comprises at least one of: (i) the area code, or (ii) the cell identifications of the overlaying macro cells;

requesting, by the private base station, a connectivity service from the public radio network by using identification data of the private base station and the location information specific to the private base station; and receiving, by the private base station, a grant to utilize the requested connectivity service once the identification data has been verified by the public radio network.

21. The method of claim 20, further comprising: scanning area codes and cell identifications of the overlaying macro cells in order to report the scanned area codes and cell identifications to an appropriate radio network node and to report the distance to the overlaying macro cells.

22. The method of claim 20, further comprising: contacting to a default IP address in order to scan information on regional connectivity possibilities.

23. The method of 20, further comprising: storing connectivity and access rights to the public radio network on a specific site once the grant to utilize the connectivity service has been received.

24. A private base station comprising:
a means for scanning data comprising at least one of: (i) area codes, or (ii) cell identifications, of overlaying macro cells of a public radio network in order to enable the private base station to report location information specific to the private base station, the location information comprising at least one of: (i) the area codes, or (ii) the cell identifications of the overlaying macro cells;

a means for requesting a connectivity service from the public radio network by using identification data of the private base station and the location information specific to the private base station; and a means for receiving grant to utilize the requested connectivity service once the identification data has been verified by the public radio network.

25. A radio network entity comprising:
a means for providing data of at least one macro cell of the radio network entity to a private base station, wherein the data comprises at least one of: (i) an area code, or (ii) a cell identification of the at least one macro cell;

a means for receiving a connectivity service request including identification data and a location information specific to a private base station from the private base station;

a means for verifying the identification data received from the private base station by communicating with an identification register for private base stations; and a means for granting the requested connectivity service to the private base station once the identification data has been verified.

26. A non-transitory computer readable storage-medium encoding a computer program of instructions for executing a computer process, the process comprising:
a means for scanning data comprising at least one of: (i) area codes, or (ii) cell identifications, of overlaying macro cells of a public radio network in order to report location information specific to the private base station, wherein the location information comprises at least one of: (i) the area codes, or (ii) the cell identifications of the overlaying macro cells;

a means for requesting a connectivity service from the public radio network by using identification data of the private base station and the location information specific to the private base station; and a means for receiving grant to utilize the requested connectivity service once the identification data has been verified by the public radio network.

27. The non-transitory computer readable storage medium of claim 26, further including at least one of the following media: a computer readable medium, a program storage medium, a record medium, a computer readable memory, a computer readable software distribution package, a computer readable signal, a computer readable telecommunications signal, and a computer readable compressed software package.

28. A non-transitory computer readable storage medium encoding a computer program of instructions for executing a computer process, the process comprising:
- a means for providing data comprising at least one of: (i) area codes, or (ii) cell identifications, of overlaying macro cells of the public radio network to a private base station, wherein th location information comprises at least one of: (i) the area codes, or (ii) the cell identifications;
- a means for receiving a connectivity service request including identification data and the location information specific to the private base station from the private base station;
- a means for verifying the identification data received from the private base station by communicating with an identification register for private base stations; and
- a means for granting the requested connectivity service to the private base station once the identification data has been verified.

29. The radio network entity of claim 5 wherein the computer program code is further configured, with the one or more processors, to cause the radio network entity to provide data of overlaying macro cells of the radio network to a private base station in order to enable the private base station to report the location specific to the private base station.

30. The radio system of claim 10 wherein the radio network entity is further configured to provide data of overlaying macro cells of the public radio network to a private base station in order to enable the private base station to report the location specific to the private base station.

31. The method of claim 15 further comprising providing data of overlaying macro cells of a public radio network to a private base station in order to enable the private base station to report the location specific to the private base station.

* * * * *

UNITED STATES PATENT AND TRADEMARK OFFICE
CERTIFICATE OF CORRECTION

PATENT NO. : 8,787,252 B2  
APPLICATION NO. : 12/666325  
DATED : July 22, 2014  
INVENTOR(S) : Volker Breuer et al.

Page 1 of 1

It is certified that error appears in the above-identified patent and that said Letters Patent is hereby corrected as shown below:

In the Claims

Claim 10:
Column 8, line 54, "report a location" should be deleted and --report location-- should be inserted.

Claim 28:
Column 11, line 17, "wherein th location" should be deleted and --wherein location-- should be inserted.

Signed and Sealed this
Thirtieth Day of September, 2014

Michelle K. Lee
*Deputy Director of the United States Patent and Trademark Office*